(12) United States Patent
Sakaida et al.

(10) Patent No.: US 10,865,113 B2
(45) Date of Patent: Dec. 15, 2020

(54) METHOD FOR PRODUCING PURIFIED AQUEOUS SOLUTION OF SILICIC ACID

(71) Applicant: NISSAN CHEMICAL INDUSTRIES, LTD., Tokyo (JP)

(72) Inventors: Hiroaki Sakaida, Funabashi (JP); Eiichiro Ishimizu, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 188 days.

(21) Appl. No.: 15/768,846

(22) PCT Filed: Oct. 14, 2016

(86) PCT No.: PCT/JP2016/080586
§ 371 (c)(1),
(2) Date: Apr. 17, 2018

(87) PCT Pub. No.: WO2017/069065
PCT Pub. Date: Apr. 27, 2017

(65) Prior Publication Data
US 2019/0055131 A1 Feb. 21, 2019

(30) Foreign Application Priority Data
Oct. 20, 2015 (JP) ................................. 2015-206377

(51) Int. Cl.
| | | |
|---|---|---|
| *C01B 33/12* | (2006.01) | |
| *C01B 33/141* | (2006.01) | |
| *C01B 33/148* | (2006.01) | |
| *C01B 33/143* | (2006.01) | |
| *B01D 15/38* | (2006.01) | |
| *B01J 39/07* | (2017.01) | |
| *B01D 15/36* | (2006.01) | |
| *B01J 39/04* | (2017.01) | |
| *B01J 39/18* | (2017.01) | |
| *B01J 45/00* | (2006.01) | |
| *B01J 47/026* | (2017.01) | |
| *C09K 3/14* | (2006.01) | |

(52) U.S. Cl.
CPC .......... *C01B 33/122* (2013.01); *B01D 15/362* (2013.01); *B01D 15/3828* (2013.01); *B01J 39/04* (2013.01); *B01J 39/07* (2017.01); *B01J 39/18* (2013.01); *B01J 45/00* (2013.01); *B01J 47/026* (2013.01); *C01B 33/141* (2013.01); *C01B 33/148* (2013.01); *C01B 33/1435* (2013.01); *C01P 2006/60* (2013.01); *C09K 3/1409* (2013.01)

(58) Field of Classification Search
CPC . C01B 33/122; C01B 33/141; C01B 33/1435; C01B 33/148; C01B 33/12; C01B 33/00; B01J 39/04; B01J 39/18; B01J 39/07; B01J 39/00; B01J 39/26; B01J 39/2604; B01J 45/00; B01J 49/00; B01J 49/06; B01J 47/02; B01J 47/022; B01J 47/026
See application file for complete search history.

(56) References Cited

U.S. PATENT DOCUMENTS

| | | | |
|---|---|---|---|
| 10,065,865 B2 * | 9/2018 | Fuhrmann | ........... C01B 33/1435 |
| 2008/0311750 A1 | 12/2008 | Izumi et al. | |
| 2010/0146864 A1 * | 6/2010 | Nakayama | .......... C01B 33/1435 51/298 |
| 2014/0013674 A1 | 1/2014 | Nakayama et al. | |
| 2014/0042359 A1 | 2/2014 | Fuhrmann et al. | |

FOREIGN PATENT DOCUMENTS

| | | |
|---|---|---|
| EP | 0557740 A2 | 9/1993 |
| JP | H06-16414 A | 1/1994 |
| JP | 2001-294417 A | 10/2001 |
| JP | 2002-173314 A | 6/2002 |
| JP | 3691047 B1 | 8/2005 |
| JP | 2013-151409 A | 8/2013 |
| JP | 2015-20919 A | 2/2015 |

OTHER PUBLICATIONS

WO2012113650, Fuhramann et al , published Aug. 2012, see machine translation (Year: 2012).*
Mar. 1, 2019 Search Report issued in European Patent Application No. 16857380.6.
Nov. 8, 2016 International Search Report issued in International Patent Application No. PCT/JP2016/080586.
Nov. 8, 2016 Written Opinion issued in International Patent Application No. PCT/JP2016/080586.

\* cited by examiner

*Primary Examiner* — Smita S Patel
(74) *Attorney, Agent, or Firm* — Oliff PLC

(57) ABSTRACT

There is provided a method for obtaining a purified aqueous solution of silicic acid containing less metal impurities such as Cu and Ni using water glass as a raw material with less number of purification steps than that in conventional methods without using any unnecessary additives. The method for producing a purified aqueous solution of silicic acid, the method comprising the steps of:

(a) passing an aqueous solution of alkaline silicate having a silica concentration of 0.5% by mass or more and 10% by mass or less through a column filled with a polyamine-, iminodiacetic acid-, or aminophosphoric acid-type chelating resin, and (b) passing the aqueous solution passed in the step (a) through a column filled with a hydrogen-type cation exchange resin.

1 Claim, No Drawings ated Patent No. 3691047

METHOD FOR PRODUCING PURIFIED AQUEOUS SOLUTION OF SILICIC ACID

TECHNICAL FIELD

The present invention relates to a method for producing a purified aqueous solution of silicic acid as a raw material for producing high-purity colloidal silica.

BACKGROUND ART

High-purity colloidal silica has been used for various applications such as a polish composition, a catalyst carrier, and a filler for resins. There are conventionally known methods, such as a method for producing the high-purity colloidal silica by a gas phase reaction using silicon tetrachloride as a raw material, and a method for producing the high-purity colloidal silica by a wet reaction using silicic acid ester as a raw material. Both the methods use an expensive silica source, which causes high producing cost.

Examples of a method for inexpensively producing the high-purity colloidal silica include a method for removing metal impurities such as Cu and Ni for purification in a step of obtaining an aqueous solution of silicic acid using water glass as a raw material. In recent years, a method for bringing a functional group forming a chelating structure into contact with specific metals to more efficiently remove metal impurities has been found out.

Patent Document 1 discloses a method for mixing a compound having an iminodiacetic acid skeleton with an aqueous solution of alkaline silicate, bringing the mixture into contact with a hydrogen-type cation exchanger, and thereafter bringing the mixture into contact with an anion exchanger to obtain a high-purity active aqueous solution of silicic acid. However, the method makes it necessary to bring a chelating compound into contact with the anion exchanger, thereby removing the chelating compound, in order to separate metal impurities trapped by the chelating compound, which results in an increase in the number of steps.

Patent Document 2 discloses a method for subjecting an aqueous solution of alkaline silicate to ultrafiltration to obtain a purified aqueous solution of alkaline silicate, subjecting the purified aqueous solution of alkaline silicate to an ionic exchange method to obtain a purified solution of silicic acid, adding hydrogen peroxide water and hydrochloric acid to the purified solution of silicic acid, and passing a chelating resin therethrough to obtain a high-purity solution of silicic acid. However, the method uses a strong oxidizer such as hydrogen peroxide water, and strong acid having high corrosiveness such as hydrochloric acid, which is not preferable in industrial production from the viewpoint of the corrosion of a device, or the like.

PRIOR ART DOCUMENTS

Patent Documents

Patent Document 1: Japanese Patent No. 3691047
Patent Document 2: Japanese Patent Application Publication No. 2013-151409

SUMMARY OF THE INVENTION

Problem to be Solved by the Invention

It is an object of the present invention to provide a purified aqueous solution of silicic acid containing less metal impurities such as Cu and Ni using water glass as a raw material with less number of purification steps than that in conventional methods, without using any unnecessary additives.

Means for Solving the Problem

A first aspect of the present invention provides a method for producing a purified aqueous solution of silicic acid, the method comprising the steps of: (a) passing an aqueous solution of alkaline silicate having a silica concentration of 0.5% by mass or more and 10% by mass or less through a column filled with a polyamine-, iminodiacetic acid-, or aminophosphoric acid-type chelating resin; and (b) passing the aqueous solution passed in the step (a) through a column filled with a hydrogen-type cation exchange resin.

A second aspect of the present invention provides the method according to the first aspect, wherein the aqueous solution is passed at a space velocity of 0.1 $h^{-1}$ or more and 15 $h^{-1}$ or less in the step (a) and the step (b).

Effect of the Invention

The use of the producing method of the present invention makes it possible to provide a purified aqueous solution of silicic acid containing less metal impurities using water glass as a raw material with less number of purification steps than that in conventional methods, without using any unnecessary additives. The use of the purified aqueous solution of silicic acid as a raw material makes it possible to provide colloidal silica containing less metal impurities.

MODES FOR CARRYING OUT THE INVENTION

A method for producing a purified aqueous solution of silicic acid of the present invention comprises the steps of: (a) passing an aqueous solution of alkaline silicate having a silica concentration of 0.5% by mass or more and 10% by mass or less through a column filled with a polyamine-, iminodiacetic acid-, or aminophosphoric acid-type chelating resin; and (b) passing the aqueous solution which has been passed in the step (a) through a column filled with a hydrogen-type cation exchange resin, to obtain the purified aqueous solution of silicic acid.

The chelating resin used for the present invention contains electron donating elements such as N, O, and P. The chelating resin is a polyamine-, iminodiacetic acid-, or aminophosphoric acid-type chelating resin in bead-like resins having a functional group forming a chelating bond with a metal ion, and preferably a polyamine-type chelating resin. The commercialized product of the chelating resin is suitably Diaion (registered trademark) CR-20 manufactured by Mitsubishi Chemical Corporation, for example.

A chelating functional group which is present in the chelating resin is bonded to ions of metal impurities such as Cu and Ni in the aqueous solution of alkaline silicate as a multidentate ligand, whereby the ions of metal impurities are removed. Since the chelating functional group needs to have negative electric charges which can neutralize positive electric charges of the ions of metal impurities, the negative electric charges have a valence of 2 or more.

The amount of the chelating resin used for the present invention is preferably set so that the chelating resin has an adsorption capacity in terms of Cu or a total exchange capacity excessive to the amount of the ions of metal impurities such as Cu and Ni in the aqueous solution of alkaline silicate.

Since the chelating resin is repeatedly used, the chelating resin is usually reproduced by a method for bringing the chelating resin into contact with an acid such as hydrochloric acid, nitric acid, or sulfuric acid to trap ions of metal impurities, desorbing the trapped ions of metal impurities, and thereafter bringing the chelating resin into contact with sodium hydroxide to provide a Na-type chelating resin.

The aqueous solution of alkaline silicate used for the present invention is also called water glass, and is an aqueous solution of sodium silicate (for example, JIS Nos. 1 to 5, molar ratio: 2.0 to 3.8), or an aqueous solution of potassium silicate (for example, JIS Nos. 1 and 2, molar ratio: 1.8 to 3.7). These alkaline aqueous solutions of silicic acid to be used are suitably diluted with water. There can also be used an aqueous solution of alkaline silicate obtained by dissolving solid sodium metasilicate in water.

The aqueous solution of alkaline silicate used for the present invention has a silica concentration of 0.5% by mass or more and 10% by mass or less, and preferably 0.5% by mass or more and 5% by mass or less.

The aqueous solution of alkaline silicate is passed through the column filled with the chelating resin at a space velocity of preferably 0.1 or more and 15.0 or less, and more preferably 0.1 or more and 9.0 or less. It is not preferable that the space velocity is lower than 0.1 from the viewpoint of production efficiency. The space velocity higher than 15.0 causes a time for contact between the aqueous solution of alkaline silicate and the resin to be short, whereby metal trapping efficiency is reduced.

The aqueous solution of alkaline silicate is passed through the column filled with the chelating resin at a temperature of preferably 10° C. or more and 40° C. or less without particular limitation.

A strongly acidic cation exchange resin and a weakly acidic cation exchange resin can be used for a hydrogen-type cation exchange resin used for the present invention, and the strongly acidic cation exchange resin is more preferably used. The commercialized product of the hydrogen-type cation exchange resin is suitably Amberlite (registered trademark) IR-120B manufactured by Organo Corporation, for example.

The amount of the hydrogen-type cation exchange resin is preferably set so that the hydrogen-type cation exchange resin has a total ion exchange capacity excessive to the amount of the ions of metal impurities such as Cu and Ni in the aqueous solution of alkaline silicate.

An aqueous solution obtained by passing the aqueous solution of alkaline silicate through the column filled with the chelating resin is passed through the column filled with the hydrogen-type cation exchange resin at a space velocity of preferably 0.1 or more and 15.0 or less, and more preferably 0.1 or more and 5.0 or less. It is not preferable that the space velocity is lower than 0.1 from the viewpoint of production efficiency. The space velocity higher than 15.0 causes a time for contact between the aqueous solution and the hydrogen-type cation exchange resin to be short, whereby metal trapping efficiency is reduced.

The aqueous solution obtained by passing the aqueous solution of alkaline silicate through the column filled with the chelating resin is passed through the column filled with the hydrogen-type cation exchange resin suitably at a temperature of 10° C. or more and 40° C. or less without particular limitation.

As a method for reproducing the hydrogen-type cation exchange resin used for the present invention, a method for bringing the hydrogen-type cation exchange resin into contact with an acid such as hydrochloric acid, nitric acid, and sulfuric acid, to trap metal ions, and desorbing the trapped metal ions, to cause the hydrogen-type cation exchange resin to return to an original state, is usually used.

The purified aqueous solution of silicic acid obtained by the present invention has a silica concentration of 0.5% by mass or more and 10% by mass or less, and contains 1 to 150 ppb of Cu and 1 to 50 ppb of Ni in terms of silica solid as metal impurities.

EXAMPLES

The amount of metal impurities of an aqueous solution of silicic acid was measured with an inductively-coupled plasma mass spectrometer (ICP-OES: Optima 4300DV and Optima 7300DV manufactured by PerkinElmer, Inc.).

Example 1

A column (a) filled with 200 ml of a polyamine-type chelating resin (Diaion (registered trademark) CR-20 manufactured by Mitsubishi Chemical Corporation, Cu adsorption capacity: 0.4 mol/L or more), and a column (b) filled with 200 ml of a hydrogen-type cation exchange resin (Amberlite (registered trademark) IR-120B manufactured by Organo Corporation) were connected in order of (a) and (b). 300 ml of an aqueous solution of alkaline silicate was passed through the columns (a) and (b). The aqueous solution of alkaline silicate was obtained by diluting sodium silicate manufactured by Fuji Chemical Industries Co., Ltd. (JIS No. 3, $SiO_2$ concentration: 29.3% by mass, $Na_2O$ concentration: 9.46% by mass, Cu concentration: 451 ppb/silica solid content, Ni concentration: 103 ppb/silica solid content) so that the aqueous solution of alkaline silicate had a silica concentration of 4.0% by mass. During passing, a solution temperature was 22° C., and a space velocity was 2.0 in both the columns (a) and (b). The obtained purified aqueous solution of silicic acid had a silica concentration of 2.9% by mass, and Cu and Ni concentrations of 25 ppb and 4 ppb, respectively in terms of silica solid content.

Example 2

A purified aqueous solution of silicic acid was obtained in the same manner as in Example 1 except that the resin amount of each of columns (a) and (b) was set to 90 ml, and a space velocity in each of the columns (a) and (b) during passing was set to 4.5. The obtained aqueous solution of silicic acid had a silica concentration of 3.6% by mass, and Cu and Ni concentrations of 75 ppb and 10 ppb, respectively in terms of silica solid content.

Example 3

A purified aqueous solution of silicic acid was obtained in the same manner as in Example 1 except that the resin amount of column (a) was set to 45 ml and the resin amount of column (b) was set to 90 ml, and a space velocity in the column (a) and a space velocity in the column (b) during passing were set to 9.0 and 4.5, respectively. The obtained aqueous solution of silicic acid had a silica concentration of 3.6% by mass, and Cu and Ni concentrations of 90 ppb and 25 ppb, respectively in terms of silica solid content.

Example 4

A purified aqueous solution of silicic acid was obtained in the same manner as in Example 1 except that a column (a)

was filled with 200 ml of an iminodiacetic acid-type chelating resin (Amberlite IRC-748 manufactured by Organo Corporation, total exchange capacity: 1.35 equivalents/L or more), and a column (b) was filled with 200 ml of a hydrogen-type cation exchange resin (Amberlite IR-120B manufactured by Organo Corporation). The obtained aqueous solution of silicic acid had a silica concentration of 2.9% by mass, and Cu and Ni concentrations of 135 ppb and 30 ppb, respectively in terms of silica solid content.

Example 5

A purified aqueous solution of silicic acid was obtained in the same manner as in Example 1 except that a column (a) was filled with 200 ml of an aminophosphoric acid-type chelating resin (Amberlite IRC-747 manufactured by Organo Corporation, total exchange capacity: 1.75 equivalents/L or more), and a column (b) was filled with 200 ml of a hydrogen-type cation exchange resin (Amberlite IR-120B manufactured by Organo Corporation). The obtained aqueous solution of silicic acid had a silica concentration of 2.3% by mass, and Cu and Ni concentrations of 96 ppb and 22 ppb, respectively in terms of silica solid content.

Comparative Example 1

A column (a) filled with 200 ml of an iminopropionic acid-type chelating resin (EPOROUS (registered trademark) MX-8 manufactured by Miyoshi Oil & Fat Co., Ltd., total exchange capacity: 1.0 equivalent/L), and a column (b) filled with 200 ml of a hydrogen-type cation exchange resin (Amberlite IR-120B manufactured by Organo Corporation) were connected in order of (a) and (b). 300 ml of an aqueous solution of alkaline silicate was passed through the columns (a) and (b). The aqueous solution of alkaline silicate was obtained by diluting water glass (sodium silicate JIS No. 3 manufactured by Fuji Chemical Industries Co., Ltd.) so that the aqueous solution of alkaline silicate had a silica concentration of 4.0% by mass. A solution temperature at that time was 22° C., and a space velocity during passing was 2.0. The obtained aqueous solution of silicic acid had a silica concentration of 2.9% by mass, and Cu and Ni concentrations of 200 ppb and 90 ppb, respectively in terms of silica solid content.

Comparative Example 2

An aqueous solution of silicic acid was obtained in the same manner as in Comparative Example 1 except that a column (a) was filled with 200 ml of a phenol-type chelating resin (Hokuetsu SB manufactured by Ajinomoto Fine-Techno Co., Inc.), and a column (b) was filled with 200 ml of a hydrogen-type cation exchange resin (Amberlite IR-120B manufactured by Organo Corporation). The obtained aqueous solution of silicic acid had a silica concentration of 2.3% by mass, and Cu and Ni concentrations of 305 ppb and 150 ppb, respectively in terms of silica solid content.

Comparative Example 3

An aqueous solution of silicic acid was obtained in the same manner as in Comparative Example 1 except that a column (a) was filled with 200 ml of a hydrogen-type cation exchange resin (Amberlite IR-120B manufactured by Organo Corporation), and a column (h) was filled with 200 ml of a polyamine-type chelating resin (Diaion CR-20 manufactured by Mitsubishi Chemical Corporation). The obtained aqueous solution of silicic acid had a silica concentration of 1.0% by mass, and Cu and Ni concentrations of 415 ppb and 190 ppb, respectively in terms of silica solid content.

Comparative Example 4

A purified aqueous solution of silicic acid obtained in the same manner as in Comparative Example 1 except that a column (a) was filled with 200 ml of a hydrogen-type cation exchange resin (Amberlite IR-120B manufactured by Organo Corporation), and a column (b) was filled with 200 ml of an iminodiacetic acid-type chelating resin (Amberlite IRC-748 manufactured by Organo Corporation, total exchange capacity: 1.35 equivalents/L or more) had a silica concentration of 2.9% by mass, and Cu and Ni concentrations of 275 ppb and 130 ppb, respectively in terms of silica solid content.

Comparative Example 5

An aqueous solution of silicic acid was obtained in the same manner as in Comparative Example 1 except that a column (a) was filled with 200 ml of a hydrogen-type cation exchange resin (Amberlite IR-120B manufactured by Organo Corporation), and a column (b) was filled with 200 ml of an aminophosphoric acid-type chelating resin (Amberlite IRC-747 manufactured by Organo Corporation, total exchange capacity: 1.75 equivalents/L or more). The obtained aqueous solution of silicic acid had a silica concentration of 2.7% by mass, and Cu and Ni concentrations of 115 ppb and 70 ppb, respectively in terms of silica solid content.

Comparative Example 6

An aqueous solution of silicic acid was obtained in the same manner as in Comparative Example 1 except that a column (a) was filled with 200 ml of a hydrogen-type cation exchange resin (Amberlite IR-120B manufactured by Organo Corporation), and a column (b) was filled with 200 ml of a phenol-type chelating resin (Hokuetsu SB manufactured by Ajinomoto Fine-Techno Co., Inc.). The obtained aqueous solution of silicic acid had a silica concentration of 2.5% by mass, and Cu and Ni concentrations of 200 ppb and 120 ppb, respectively in terms of silica solid content.

Comparative Example 7

300 ml of an aqueous solution of alkaline silicate was passed through a column filled with 200 ml of a hydrogen-type cation exchange resin (Amberlite IR-120B manufactured by Organo Corporation). The aqueous solution of alkaline silicate was obtained by diluting water glass (sodium silicate ES No. 3 manufactured by Fuji Chemical Industries Co., Ltd.) so that the aqueous solution of alkaline silicate had a silica concentration of 4.0% by mass. A solution temperature at that time was 22° C., and a space velocity during passing was 4.5. The obtained aqueous solution of silicic acid had a silica concentration of 3.7% by mass, and Cu and Ni concentrations of 190 ppb and 90 ppb, respectively in terms of silica solid content.

The concentrations of metal impurities of the aqueous solutions of silicic acid obtained in the steps described in Examples 1 to 5 and Comparative Examples 1 to 7 were summarized in Table 1. Each of the aqueous solutions of silicic acid obtained in Examples 1 to 5 according to the step (a) and the step (b) of the present invention had lower concentrations of metal impurities (Cu, Ni) than those of the aqueous solutions of silicic acid obtained in the steps of Comparative Examples 1 to 7, which exhibited higher purification.

TABLE 1

|  | Step (a) | Step (b) | Space velocity SV Step (a) | Step (b) | Cu ppb | Ni ppb |
|---|---|---|---|---|---|---|
| Example 1 | polyamine-type chelating resin | hydrogen-type cation exchange resin | 2 | 2 | 25 | 4 |
| Example 2 | polyamine-type chelating resin | hydrogen-type cation exchange resin | 4.5 | 4.5 | 75 | 10 |
| Example 3 | polyamine-type chelating resin | hydrogen-type cation exchange resin | 9 | 4.5 | 90 | 25 |
| Example 4 | iminodiacetic acid-type chelating resin | hydrogen-type cation exchange resin | 2 | 2 | 135 | 30 |
| Example 5 | aminophosphoric acid-type chelating resin | hydrogen-type cation exchange resin | 2 | 2 | 96 | 22 |
| Comparative Example 1 | iminopropionic acid-type chelating resin | hydrogen-type cation exchange resin | 2 | 2 | 200 | 90 |
| Comparative Example 2 | phenol-type chelating resin | hydrogen-type cation exchange resin | 2 | 2 | 305 | 150 |
| Comparative Example 3 | hydrogen-type cation exchange resin | polyamine-type chelating resin | 2 | 2 | 415 | 190 |
| Comparative Example 4 | hydrogen-type cation exchange resin | iminodiacetic acid-type chelating resin | 2 | 2 | 275 | 130 |
| Comparative Example 5 | hydrogen-type cation exchange resin | aminophosphoric acid-type chelating resin | 2 | 2 | 115 | 70 |
| Comparative Example 6 | hydrogen-type cation exchange resin | phenol-type chelating resin | 2 | 2 | 200 | 120 |
| Comparative Example 7 | hydrogen-type cation exchange resin |  | 4.5 |  | 190 | 90 |

INDUSTRIAL APPLICABILITY

When colloidal silica is produced using a purified aqueous solution of silicic acid obtained in the present invention as a raw material, heavy metals in the colloidal silica can be considerably reduced, whereby the polluting a semiconductor wafer by the heavy metals contained in the colloidal silica can be restrained, for example, in a precision polishing step for the semiconductor wafer or the like. The use of inexpensive water glass as a raw material provides a low-cost method, which is industrially useful.

The invention claimed is:

1. A method for producing a purified aqueous solution of silicic acid, the method comprising the steps of:

(a) passing an aqueous solution of alkaline silicate through a column filled with a polyamine-type chelating resin at a space velocity of 0.1 $h^{-1}$ or more and 15 $h^{-1}$ or less; and (b) passing the aqueous solution which has been passed in the step (a) through a column filled with a hydrogen-type cation exchange resin a space velocity of 0.1 $h^{-1}$ or more and 15 $h^{-1}$ or less for obtaining purified aqueous solution of silicic acid having silica concentration of 0.5% by mass or more and 10% by mass or less, wherein the purified aqueous solution of silicic acid that is obtained has 1-150 ppb of Cu and 1-50 ppb of Ni in terms of silica solid as metal impurities.

* * * * *